(12) United States Patent
Allahwerdi (10) Patent No.: US 7,408,942 B1
(45) Date of Patent: Aug. 5, 2008

(54) ELEMENT FOR A COMMUNICATIONS SYSTEM

(75) Inventor: Nouri Allahwerdi, Espoo (FI)

(73) Assignee: Nokia Corporation, Espoo (FI)

( * ) Notice: Subject to any disclaimer, the term of this patent is extended or adjusted under 35 U.S.C. 154(b) by 890 days.

(21) Appl. No.: 10/009,443

(22) PCT Filed: Jun. 2, 2000

(86) PCT No.: PCT/IB00/00840

§ 371 (c)(1),
(2), (4) Date: Apr. 10, 2002

(87) PCT Pub. No.: WO00/76145

PCT Pub. Date: Dec. 14, 2000

(30) Foreign Application Priority Data

Jun. 4, 1999 (GB) ................... 9913102.1

(51) Int. Cl.
 H04L 12/28 (2006.01)
(52) U.S. Cl. ..................... 370/401; 370/410
(58) Field of Classification Search ............... 370/310, 370/351, 352, 328, 338, 401
See application file for complete search history.

(56) References Cited

U.S. PATENT DOCUMENTS

| | | | | |
|---|---|---|---|---|
| 6,014,377 | A * | 1/2000 | Gillespie | 370/351 |
| 6,061,346 | A * | 5/2000 | Nordman | 370/352 |
| 6,195,705 | B1 * | 2/2001 | Leung | 709/245 |
| 6,285,680 | B1 * | 9/2001 | Steinka et al. | 370/431 |
| 6,320,873 | B1 * | 11/2001 | Nevo et al. | 370/466 |
| 6,377,804 | B1 * | 4/2002 | Lintulampi | 455/435.2 |
| 6,434,140 | B1 * | 8/2002 | Barany et al. | 370/352 |
| 6,560,443 | B1 * | 5/2003 | Vaisanen et al. | 455/73 |
| 6,608,832 | B2 * | 8/2003 | Forslow | 370/353 |
| 6,636,502 | B1 * | 10/2003 | Lager et al. | 370/352 |
| 6,711,147 | B1 * | 3/2004 | Barnes et al. | 370/338 |
| 6,721,306 | B1 * | 4/2004 | Farris et al. | 370/352 |
| 6,801,509 | B1 * | 10/2004 | Chuah et al. | 370/328 |
| 6,853,851 | B1 * | 2/2005 | Rautiola et al. | 455/553.1 |
| 6,970,459 | B1 * | 11/2005 | Meier | 370/389 |

(Continued)

FOREIGN PATENT DOCUMENTS

WO WO 96/21984 7/1996

(Continued)

OTHER PUBLICATIONS

Y. Rekhter and T.Li, RFC 1771, Mar. 1995, Network Working Group.*

(Continued)

Primary Examiner—Andrew C. Lee
(74) Attorney, Agent, or Firm—Squire Sanders & Dempsey L.L.P.

(57) ABSTRACT

A network element (104), said network element being arranged to act between a first IP based network (100) and a second packet data network (200), said element comprising: a first interface arranged to communicate with said first IP based network using said IP protocol to receive signals from and send signals to the first network, said first IP based network being a private computer based network comprising wireless capabilities, a second interface arranged to communicate with said second network via an IP based connection to receive signals from and send signals to the second network.

23 Claims, 3 Drawing Sheets

U.S. PATENT DOCUMENTS

| | | | |
|---|---|---|---|
| 7,020,120 B2 * | 3/2006 | Inoue et al. | 370/338 |
| 7,025,209 B2 * | 4/2006 | Hawkins | 209/217 |
| 7,042,855 B1 * | 5/2006 | Gilchrist et al. | 370/328 |
| 7,085,257 B1 * | 8/2006 | Karves et al. | 370/352 |

FOREIGN PATENT DOCUMENTS

| | | |
|---|---|---|
| WO | WO 98/32301 | 7/1998 |
| WO | WO 98/32304 | 7/1998 |

OTHER PUBLICATIONS

M. Wahl, T. Howes, S. Kille, RFC 2251, Dec. 1997, Network Working Group.*

Jori Paananen: "Internet Telephony merges with the GSM Network" ERCIM News Online Edition, Online!. April 19999 (1999-004), pp. 1-2, XP002124263, Retrieved from the Internet: URL:http://www.ercim.org/publication/Ercim_News/en37/paananen._Html 'retrived on Nov. 25, 1999!.

Markku Kylänpää : "Mobile Multimedia White Paper" VTT/ Projects, 'online! Oct. 12, 1998, pp. 1-6, XP002124264 Retrieved from the Internet: URL:http://www3.vtt. fi/tte/projects/mobmulti/mobmulti.html> 'retrieved on Nov. 25, 1999!.

Peng Chengyuan: "General Packet Radio Service (GPRS)" Esitelmat/GPRS, 'Online! Apr. 15, 1999, pp. 1-16, XP002124265 Retrieved from the Internet: <URL:http://www.tcm.hut.fi/Opinnot/T...50/1999/Esitelmat/GPRS/gprs.htm. 'retrieved on Nov. 26, 1999!.

Heimo Laamanen: "GPRS" GPRS-Luento, 'Online! Feb. 5, 1997, pp. 1-55, XP002124266, Retrieved from the Internet: ,URL:http://www.cs.helsinki.fi/{helaaman/gprs_luento/sld001.htm>, 'retrieved on Nov. 26, 1999!.

* cited by examiner

ELEMENT FOR A COMMUNICATIONS SYSTEM

FIELD OF THE INVENTION

The present invention relates to an element for a communications system in particular but not exclusively for use in a general packet radio service (GPRS) type system. The present invention also relates to a communications system incorporating the element.

BACKGROUND OF THE INVENTION

Known office based communication systems usually operate with fixed line telephone units within the office linked via an internal switch board or PBX (private branch exchange). Such fixed line systems are able to provide relatively high voice quality although users are not able to move for the duration of a call.

The advent of wireless cellular telecommunication technologies, an example of which is the GSM standard (Global System for Mobile communications) means that wireless systems can provide at least the equivalent voice quality as compared to fixed line systems. Wireless cellular systems also have the advantage that the user can move.

WIO "wireless intranet office" is a proprietary communication system which is being developed by the present applicants. This WIO system introduces the concept of utilizing mobile terminals, such as conventional GSM mobile stations, in an office environment. The system makes use of a known concept called Internet telephony or voice-over-IP. (IP stands for Internet protocol.)

Voice-over-IP allows audio, video and data information to be transmitted over the existing IP-based local or wide area networks, or the Internet. The technology thus provides for convergence and integration of the communication of three different data types over the same network.

Prior to the introduction of voice-over-IP, offices often operated thee separate networks for the transmission of audio, video and data information. Fixed line telephone systems coupled to an in-house PBX provided voice communication. An office based local area network (LAN) or intranet (i.e. a packet switched internal network) having computer terminals linked via network cards and under the control of a server station provided for the transmission of "conventional" computer data. Video cameras linked to monitors via a fixed line or wireless link provided for video communications. With voice-over-IP, audio, video and data information can be transmitted simultaneously using the same packet-switched network or LAN throughout the office environment and beyond the confines of the office.

In order to provide for such media convergence, voice-over-IP often uses a specific ITU (International Telecommunication Union) standard protocol to control the information flow over the intranet. One common standard protocol used in voice-over-IP systems, and the one used in the WIO system is termed H.323. H.323 is an ITU standard for multimedia communications (for example voice, video and data) and allows multimedia streaming over conventional packet-switched networks. The protocol provides for call control, multi media management and bandwidth management for both point-to-point (two end users in communication) and multi point (three or more end users in communication) conferences.

The H.323 protocol is network, platform and application independent allowing any H.323 compliant terminal to operate in conjunction with any other terminal.

The H.323 standard defines the use of three further command and control protocols. H.245 is for call control and is responsible for control messages governing the operation of the H.323 terminal including capability exchanges, commands and indications. Q.931 is for call signalling and is used to set up a connection between two terminals. The RAS (Registrations, Admissions and Status) signalling function governs registration, admission and bandwidth functions between endpoints and gatekeepers. Gatekeepers will be discussed in more detail hereinafter.

For a H.323 based communication system, the standard defines four major components: terminals; gateways; gatekeepers; and multi point control units (MCU).

Terminals are the user end-points on the network and can be a telephone mobile or fixed, a fax unit or a computer terminal. All H.323 compliant terminals must support voice communications and optionally video and data communications.

Gateways connect H.323 networks to other networks or protocols. For an entirely internal communications network, i.e. one with no external call facility, gateways are not required.

Gatekeepers are the control centres of the voice-over-IP network. It is under the control of a gatekeeper that most transactions (communication between two terminals) are established. The primary functions of the gatekeeper are, bandwidth management, call control controlling the number of simultaneous H.323 connections and controlling the amount of bandwidth those calls consume. An H.323 "zone" is defined as a collection of all terminals, gateways and multi point-control units (MCU) which are managed by a single gatekeeper. Multi point control units (MCU) support communications between three or more terminals. The MCU comprises a multi point controller (MC) which performs H.245 negotiations between all terminals to determine common audio and video processing capabilities, and a multi point processor (MP) which routes audio, video and data streams between terminals. The conventional voice-over-IP system described hereinbefore normally utilizes standard fixed-line telephone systems which are subject to the disadvantages of a lack of mobility and a lack of user commands.

The WIO concept takes voice-over-IP further in that it provides for the use of conventional mobile terminals, such as GSM mobile stations, within the voice-over-IP system. To provide for such mobile communications within an intra-office communication network, the WIO system combines known voice-over-IP with the use of conventional wireless terminals within the voice-over-IP system. Those telephone units may be GSM mobile stations. This WIO concept may be in the context of a intra-office communication network.

Thus, in the WIO system intra-office calls to mobile stations are routed through the office intranet and external office calls are routed conventionally through the GSM network. Such a system provides most or all of the features supported by the mobile station and the GSM network such as telephone directories, short messaging, multiparty services, data calls, call barring, call forwarding etc. WIO thus provides for integrated voice, video and data communications by interfacing an H.323 based voice-over-IP network with a GSM mobile network.

The WIO system is a cellular network similar to the conventional GSM network and is divided into H.323 zones as discussed hereinbefore. One H.323 zone may comprise a number of GSM cells. Two or more H.323 zones may be contained with an administrative domain.

The General Packet Radio Service (GPRS) standard has been proposed in the context of the GSM standard for the communication of data packets in a wireless network. Typical GPRS elements are: gateway GPRS support nodes (GGSN) which act as a gateway between the GPRS system and an external packet switched network; and serving GPRS support nodes (SGSN) which are connected between the GGSN and a base station system and keep track of the location of mobile stations, perform security functions and access control. These elements are in addition to the usual network elements. To date, the WIO system has not supported GPRS.

The GPRS service is usually provided by the operator of the GSM wireless network. This means that even if the GPRS service is provided between two users within an internal corporate network, the external operator will levy a charge. If a company decides to invest in a corporate network, the company will not want to pay the external operator for calls which are entirely within the corporate wireless network, regardless of whether the call is a voice or data oriented.

SUMMARY OF THE INVENTION

It is an aim of embodiments of the presence invention to allow the proposed WIO concept or the like to support a GPRS service or the like. It is an aim of further embodiments of the present invention to address the problem discussed hereinbefore.

According to one aspect of the present invention, there is provided a network element, said network element being arranged to act between a first IP based network and a second packet data network, said element comprising a first interface arranged to communicate with said first IP based network using said IP protocol to receive signals from and send signals to the first network, a second interface arranged to communicate with said second network via an IP based connection to receive signals from and send signals to the second network.

According to a second aspect of the present invention, there is provided a communication system having a first IP based network and a second packet data network, the first and second networks being connected by a network element as defined above.

Other objects and features of the present invention will become apparent from the following detailed description considered in conjunction with the accompanying drawings. It is to be understood, however, that the drawings are intended solely for purposes of illustration and not as a definition of the limits of the invention, for which reference should be made to the appended claims.

BRIEF DESCRIPTION OF DRAWINGS

For a better understanding of the present invention and as to how the same may be carried into effect, reference will now be made by way of example to the accompanying drawings in which.

DESCRIPTION OF PREFERRED EMBODIMENT

Figure 1:
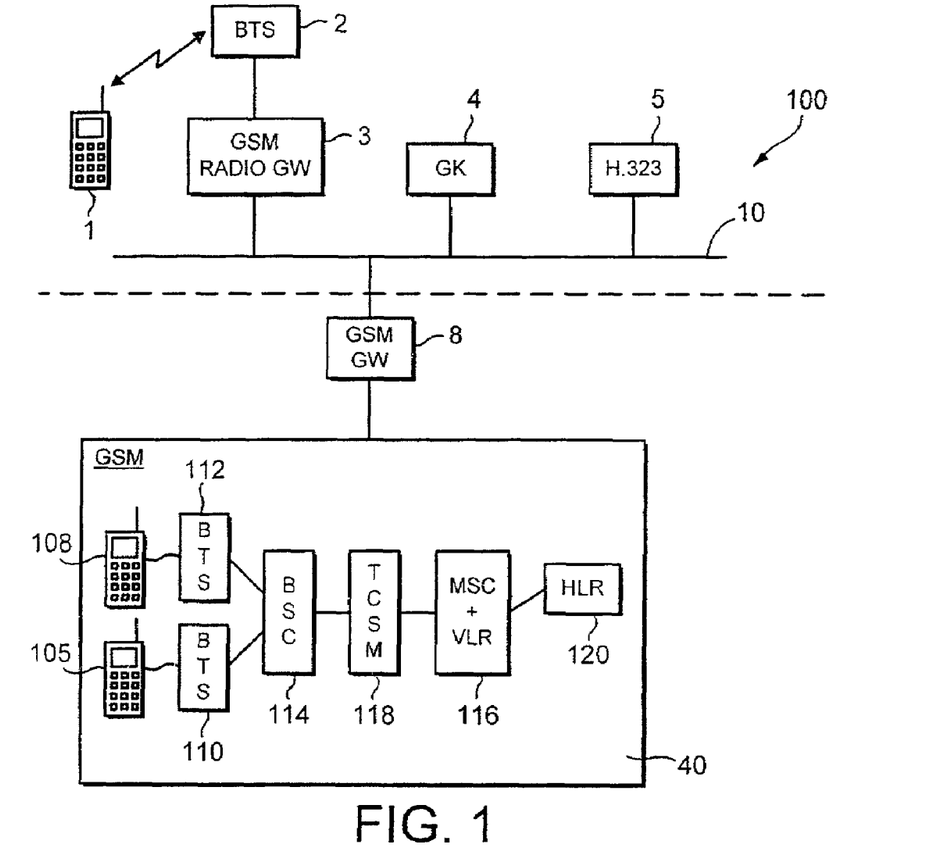
FIG. 1 shows a block diagram of a WIO system.

Reference will now be made to FIG. 1 which shows a WIO network.

In the office environment 100, the WIO system is implemented. The WIO system has an IP (Internet protocol) based LAN 10 which is operable to carry packet form data.

One or more mobile stations (MS) 1 communicate, i.e. transmit signals to and/or receive signals from, a base transceiver station (BTS) 2. The base transceiver station 2 used in the WIO system is similar to the base transceiver stations used in conventional GSM cellular communications systems in that the base station 2 is connected to, and operates in conjunction with, a controller. In a conventional GSM system, the controller is termed a base station controller (BSC). However, in the WIO system, the controller is represented by a GSM radio access gateway 3, the function of which will be described hereinafter. The base transceiver station 2 therefore receives signals transmitted by the mobile station 1 and forwards them to the GSM radio access gateway 3. The GSM radio access gateway 3 is also connected to the LAN 10.

A WIO gatekeeper (WGK) 4 is connected to the LAN 10 as is a H.323 terminal 5. The H.323 terminal 5 may be represented by a computer terminal which may support voice and data communication.

Connected to the LAN 10 is a GSM gateway (GGW) 8. The GSM gateway 8 is connected to a standard GSM network 40 as used in conventional mobile communication systems. The network is sometimes referred to as a public land network. The WIO system allows for the use of mobile telephones in the office environment to make both internal and external office calls.

Typical components of a standard GSM network 40 are shown in FIG. 1. Mobile stations 105 and 108 are associated with respective base transceiver stations 110 and 112. The respective base transceiver stations (BTS) 110 and 112 are both controlled by the same base station controller (BSC) 114. Communications are controlled by a mobile services switching centre (MSSC) 116 and accordingly, signals from the base station controller 114 are output to the mobile services switching centre 116 via a transcoder and substrate channel multiplexer (TCSM) 118. Likewise, commands for the base station controller 114 from the mobile switching centre 116 pass via the transcoder and substrate channel multiplexer 118. The mobile services switching centre 116 also incorporates a visitor location register (VLR). The mobile switching centre 116 has access to a home location register (HLR) 120. In practice, a large number of base transceiver stations are provided and there may be more than one base station controller and mobile services switching centre 116.

It should be appreciated that signals from the GSM gateway 8 for the GSM network are forwarded to the mobile services switching centre 116 and vice versa.

The functions of the WIO components of FIG. 1 will now be described in more detail. The GSM radio access gateway 3 performs similar functions to that of a base station controller in a conventional GSM network such as the management of radio resources and channel configuration and the handling of the base transceiver station configuration. However, the GSM radio access gateway 3 also provides conversion from the GSM voice data to packet based data suitable for transmitting on the packet based LAN 10. During a call, therefore, the GSM radio access gateway 3 converts the voice data transmitted by the base station 2 to the GSM radio access gateway 3 into packet-based data suitable for transmitting on the LAN 10.

The WIO gatekeeper 4 is the main controller of the WIO system and has a high processing capability. It is responsible for all of the functions which the H.323 protocol defines to its gatekeeper, including call management and call signalling. It is also responsible for mobility management. The WIO gatekeeper 4 is able to manage the main different cell types such as voice, data, facsimile and conference calls which can be established between a mobile station, a computer terminal and a normal telephone in any combination.

The GSM gateway 8 handles communications between the WIO environment and the mobile switching centre 116 of the GSM network 40. From the mobile services switching centre 116 viewpoint, the WIO appears to be a conventional base station subsystem. The GSM gateway 8 also provides isolation means for disconnecting the WIO system from the mobile services switching centre 116 in the event of WIO system failure.

The telephone calls managed by the WIO system can be divided into internal and external calls. With internal calls. Both users are in the WIO environment when the call is an external call, only one user is in the WIO environment.

Figure 2:
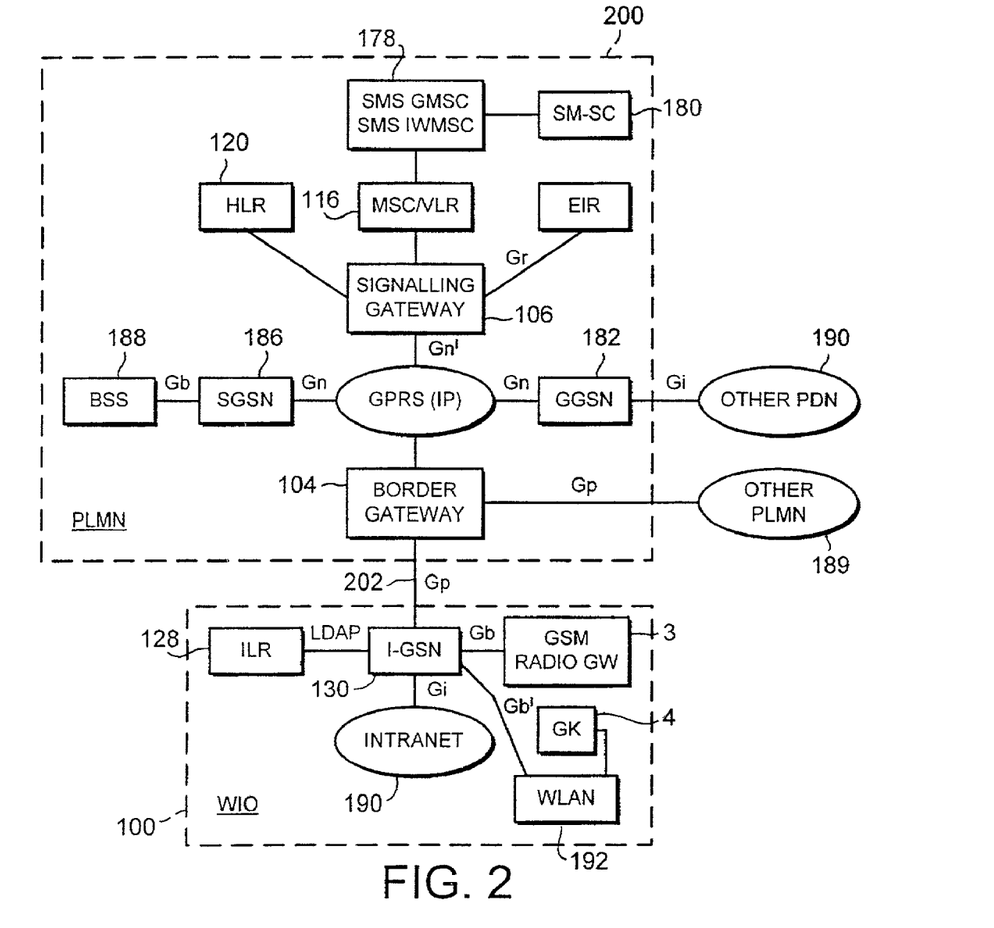
FIG. 2 shows a block diagram of a modified WIO system with GPRS capability.

Reference is now made to FIG. 2 which illustrates how the system shown in FIG. 1 can be modified to provide a general packet radio service (GPRS). The external network connected to the WIO environment 100 is a GPRS network 200 which has GSM and GPRS capabilities. In order to implement the GPRS network 200, the usual GSM components are used, generally with the addition of two further GPRS network nodes, the serving GPRS support node (SGSN) 186 and the gateway GPRS support node (GGSN) 182. The SGSN 186 is connected between the GGSN 182 and the base station system 188 and keeps track of the mobile stations and performs security functions and access control. The GGSN 182 acts as a gateway between the GPRS system and another packet data network (PDN) 190.

In the office environment 100, an intranet location register (ILR) 128 is provided. The intranet location register is connected to an Intranet GPRS support node IGSN 130 which will be described in more detail hereinafter. This may be via, for example the LAN 10 of the system of FIG. 1. The intranet location register 128 effectively provides the function of a home location register. However, unlike the home location register which is controlled by the network operator, the intranet location register 128 is accessible by the authorised employees of the company, such as managers of the internal network, using the WIO system. In other words, the intranet location register 128 can be corporate based.

It is alternatively possible for the intranet location register 128 to be Internet service provider based. This register 128 allows a user within the WIO environment 100 to use a GPRS service where the originator and destination are both within the WIO office environment without any signalling occurring externally of the office network.

The intranet location register 128 contains a database of subscribers in the company and allows the users to be authenticated within the company network. The intranet location register 128 also stores information as to whether a given user is permitted to roam outside the company network. The intranet location register 128 permits free GPRS services to be offered within the corporate network even if the intranet is geographically distributed.

The intranet location register 128 is LDAP (lightweight directory access protocol) based. LDAP is a protocol which is an IETF (Internet Engineering Task Force) standard. This protocol is a standardized protocol for the accessing subscriber and device configuration information in "directory enabled" Internet protocol networks. "Directory enabled" Internet protocol networks rely on a register(s) storing relevant information on the users within the office environment 100. This information includes information on the identity of the users as well as device configuration information of the user.

The protocol which is used by the intranet location register 128 is selected so as to be compatible with or the same as protocols used by information technology departments of corporations. This allows the information technology departments to manage the register easily. It also allows for simple implementation of the register 128 on a personal computer or the like. This means that embodiments of the invention can be implemented in a cost effective manner.

The GSM gateway 8 of FIG. 1 can be modified to incorporate GPRS signalling support so that a user within the WIO environment is able to communicate with the external world using the GSM network to transmit GPRS packets of data. This signalling also permits an external user using the GSM network to send GPRS packets of data to a user within the WIO office. This means that GPRS tunnelling protocols are supported by the GSM gateway 8. Additionally home location register 120 related GPRS signalling support is added to the GSM gateway 8.

However, an alternative preferred embodiment will now be described in relation to FIG. 2.

In the following discussion, the following abbreviations are used.

SS7 Signalling System No 7 (ITU standard, the common language between telephone networks).
MAP Mobile Application Part (part of the TCP/IP protocol suite, specific to GSM).
TCAP Transaction Capabilities Application Part (part of the TCP/IP protocol suite).
SCCP Signalling Connection Control Part (part of the SS7 protocol suite).
MTP3 Message Transfer Protocol, Level 3 (part of the SS7 protocol suite).
MTP2 Message Transfer Protocol, Level 2 (part of the SS7 protocol suite).
MTP1 Message Transfer Protocol, Level 1 (part of the SS7 protocol suite).
GTP GPRS Tunnelling protocol.
L2TP Layer 2 Tunnelling Protocol.
TCP Transmission Control Protocol (part of the TCP/IP protocol suite, maintained by IETF).
UDP User Datagram Protocol (part of the TCP/IP protocol suite, maintained by IETF).
IP Internet Protocol (part of the TCP/IP protocol suite, maintained by IETF).
IPSec IP Security extensions to the TCP/IP protocol suite (IETF).
MIP Mobile IP, mobility extensions to the TCP/IP protocol suite (IETF).
EIR Equipment Identity Register.
BSS Base Station Subsystem.
ITU International Telecommunications Union.
IETF Internet Engineering Task Force.
VLR Visitor Location Register.
SMS-GMSC Short Message Service Gateway Mobile Switching Centre.
HLR Home Location Register.
EIR Equipment It should be noted that the protocol layers MTP1-2 define the physical implementation of the "narrowband" SS7 network. The MTP3 layer of the SS7 protocol suite is used to transfer messages between two addresses, in a "narrowband" SS7. The MTP3 layer includes features which makes SS7 relatively tolerant to physical faults. Application level signalling messages which are transaction specified such as MAP messages, are transferred over the TCAP layer. The TCAP layer within SS7 is transferred over the SCCP layer. The SCCP layers relies on the MTP3 layer for addressing and some level of fault tolerance. All signalling toward SS7 networks within GPRS is based on MAP.

In an IP based network, application level messages may be transferred e.g. via UDP (with no guarantee that message was ever received by recipient) or via TCP (which includes "handshaking" and retransmission mechanisms, that guarantee delivery within certain constrains, if physically possible). The TCP/IP protocol suite does not go down to the physical levels, so it does not inherently include the level of fault tolerance introduced by MTP3 to the full SS7 protocol stack.

TCP/IP can be made relatively reliable, by designing the physical network in a reliable way, independent of the higher level TCP/IP protocols. The upper levels of SS7 may in practice be carried of TCP/IP based network although this is not yet standardised.

As an alternative to the modified GSM gateway, a more general signalling gateway 106 in the GPRS network 200 can be provided which acts a relay between TCAP/SCCP/MTP3/MTP2/MTP1 protocols of the GPRS network 200 and TCAP/UDP/IP protocols of the WIO network 100. The signalling gateway 106 is required to implement the functions of the Gs (between the SGSN and the VLR) interface, the Gd (between the SGSN and the SMS-GMSC) interface, the Gr (between the SGSN and the HLR) interface, the Gc (between the GGSN and the HLR) interface and the Gf (between the SGSN and the EIR) interface. The signalling gateway 106 permits the IGSN 130 to support the functions of these interfaces over IP without having to support the SS7 protocol by carrying out the necessary protocol conversions.

The signal gateway does not modify application level signals but does modify the transmission level signals as the signalling gateway acts as a mediator between the two physically different types of networks.

The intranet GPRS support node (IGSN) 130 is provided to add GPRS backbone functionality, that is the function typically provided by the service GPRS support nodes and gateway GPRS support nodes, into the WIO office network. In other words the IGSN 130 provides some of the same functionality which is provided by the SGSN 186 and the GGSN 182 in the GPRS network 200. The IGSN 130 implements therefore a combination of SGSN and GGSN functionality with appropriate modifications to make the IGSN 130 as a single standard alone element which can be included in the office or the like of a corporate user. The IGSN 130 is connected either directly or via the LAN 10 to the intranet location register 128, the intranet 190 and the GSM radio access gateway 3.

The modifications involve removing any non-IP based external interfaces from the corporate user's version of GPRS. Thus, there are two modified interfaces compared to standard GPRS elements. Firstly the frame relay based station controller interface, known as Gb in GPRS must be modified to allow communication with the GSM radio access gateway 3 using the Internet protocol. The interface between the SGSN 186 and the base station system 188 is the Gb interface in the conventional GPRS system 200. The GSM radio access gateway 3 may be functionally equivalent to the base station controller of a conventional GPRS system. The protocol stack which implements the interface using the Internet protocol between the IGSN 130 and the GSM radio access gateway 3, could be e.g. BSS Gb/L2TP/IP or BSS Gb/GTP/UDP/IP. Both L2TP and GTP are known tunnelling protocols, which can be used to carry BSS Gb over IP. Any other tunnelling protocols may alternatively be used to carry BSS Gb-over-IP. These protocol stacks permit signals received in the format usually used in the Gb interface to be converted to IP signals.

Secondly, the SS7 based interfaces with the GSM core networks network elements must be modified, so that the Intranet-GSN 130 may communicate with them over an IP based interface. The SS7 interfaces are with the MSC/VLR (i.e. the Gs interface in GPRS), with the short message service gateway mobile switching centre (SMS-GMSC) (Gd interface), with the HLR (Gr and Gc interfaces), and the EIR (Gf interface). All of these interfaces of the known GPRS system use a subset of the GSM-MAP protocol (Mobile Application Part) over a TCAP/SCCP/MTP3/MTP2/MTP1 protocol stack. The IGSN 130 instead implements a MAP/TCAP/UDP/IP protocol stack to communicate with a network element in the operator's network acting as a signalling gateway i.e. signalling gateway 106. In other words communications between the IGSN 130 and the GPRS network 200 is via this stack so that signals for the office network are in the IP format and signal from the office network to the GPRS network are in the MAP format.

As can be seen from FIG. 2 the intranet GPRS support node 130 is connected to the intranet location register 128, the intranet 190 which may be the same or different to LAN 10, the GSM radio access gateway and a wireless local area network 192 (i.e. the network including the mobile stations 1 and base transceiver stations 2).

The IGSN 130 may incorporate signalling support for the GSM gateway 8 if there is not separate signalling gateway 106.

The GPRS signalling from the external environment is converted by the IGSN 130 into LDAP protocol requests for those subscribers who are managed by the corporate department or Internet service provider managing the WIO environment. In other words, the operator of the WIO environment can take the place of the GSM service provider and the intranet location register 128 can take over the function of the home location register. The IGSN 130 therefore masks the existence of the LDAP data base from the rest of the GPRS network 200.

The intranet GPRS support node 130 can also act in similar manner to the gateway GPRS support nodes and border gateways between different operators in convention GPRS systems. The Gp interface 202 between the GPRS backbones of two telecommunication operators is provided by border gateway 104 functionality. The border gateway functionality is incorporated in the IGSN 130 providing it with a secure IP based tunnel over the Internet, to the GPRS backbone operated by the network operator, i.e network 200. The WIO environment 100 and the GPRS networks 200 can be regarded as separate networks each of which has a border gateway 104 or border gateway functionality to allow secure communications between the networks.

One way to implement this functionality in the IGSN is to provide an IPSec based tunnel from the IGSN 130 to the border gateway 104 of the GPRS network 200. The border 104 gateway of the network 200 may typically be an firewall router product. Any other secure IP based virtual private network (VPN) technology may be alternatively used. It is also possible to have a dedicated line between the border gateway 104 and the IGSN 130.

The intranet GPRS support node 130 thus acts as a gateway between the intranet location register 128 and the GPRS network 200 operated by the external operator. Thus the intranet GPRS support node 130 converts GPRS signals from the GSM network into a form in which they are compatible with the intranet location register 128 of the WIO office. Likewise, the intranet GPRS support node 130 ensures that signals intended to be GPRS signals in the GSM network from the WIO office are converted into a form compatible with the GPRS service.

The operability of the intranet GPRS support node 130 supported WIO office and the external GSM network providing the GPRS service is established with roaming agreements between the GSM network operator and the WIO office provider. The link between the GSM operator which provides the GPRS service and the intranet GPRS support node 130 is as discussed hereinbefore provided by the border gateway 104 and the border functionality of the IGSN 130. The border gateway 104 and border functionality of the IGSN 130 provides a link similar to that provided by gateways between different GSM operators in conventional systems. The GPRS network 116 comprises the usual GPRS components including: mobile switching centre MSC and visitor location register VLR 116; home location register HLR 120; short message service gateway mobile switching centre/short message service interworking mobile switching centre SMS-GMSC/SMS-IWMSC 178; short message service centre SMS-SC 170; gateway GPRS switching node GGSN 182 providing a connection to other packet data networks PDN 184; serving GPRS support node SGSN 186; and base station subsystem BSS 188. The border gateway BGW 106 may be connected to another public land mobile network PLMN 189.

It should be appreciated that the intranet GPRS support node 130 does not need to provide all the functions of conventional serving GPRS support nodes in that only Internet protocol interfaces are required. As discussed hereinbefore, known serving GPRS support nodes typically have more than one interface to deal with, such as frame relay and the SS7 protocols as well as interfaces to deal with the Internet protocol.

Figure 3:
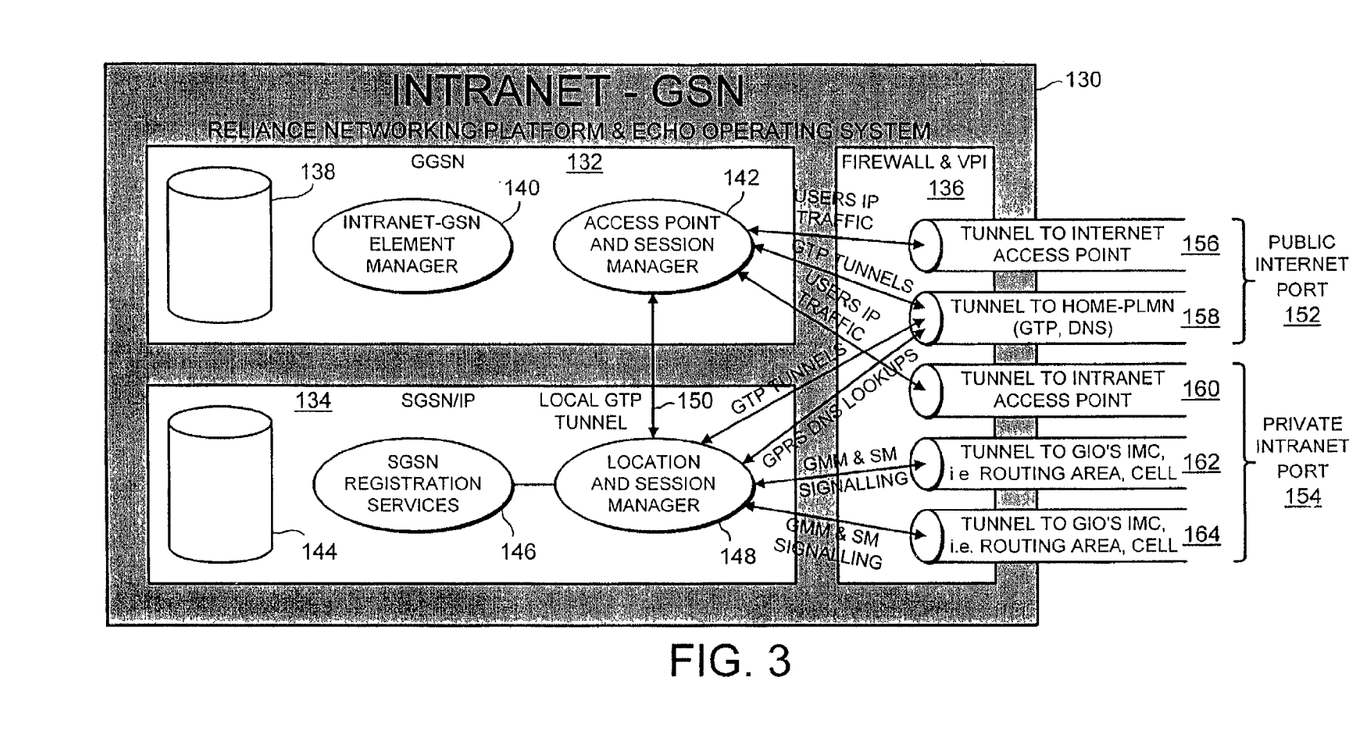
FIG. 3 shows a block diagram of the intranet GPRS support node of FIG. 2.

Reference is made to FIG. 3 which shows a block diagram of the intranet GPRS support node 130 of FIG. 2. FIG. 3 shows schematically the functions of this node. The intranet GPRS support node 130 has a first part 132 which provides the gateway GPRS support node functionality and a second part 134 which provides the serving GPRS support node functionality with the Internet protocol function. Additionally a third part 136 provides a firewall and virtual private network function. This latter function allows secure (encrypted) tunnels between geographically distributed intranet sites over the Internet. Any suitable product can be used to achieve this function.

The first part 132 has a first, register 138 which stores information relating to the packet data protocol PDP context management and the access point. The first part 132 also has a intranet GPRS support node element manager and access point and session manager 142. The access point and session manger 142 has, via the third part 136, connections for the user's Internet protocol traffic between the WIO office and a public Internet port 152 or a private intranet port 154. The public Internet port 152 allows the connection with a public network eg network 200 of FIG. 2. The private intranet port 154 allows the connection with the WIO network of FIG. 1.

The second part 134 has a register 144 for storing GPRS mobility management information and packet data protocol PDP context information. The second part 134 also has a serving GPRS support node registration services part 146 and a location and session manager 148. The location and session manager 148 and the access point and session manager 142 are connected together by a connection 150 using the GPRS tunnelling protocol GTP to allow the exchange of information there between. The location and session manager 148 is also connected via the firewall 136 to the public Internet and private Intranet ports 152 and 154.

The third part 136 of the intranet GPRS support node 130 provides a firewall function and thus prevents unauthorised communications from taking place between the private intranet and the public Internet.

The public Internet port 152 has two tunnels or connections. The first connection 156 allows a connection with an Internet access point, eg to an IP network. This connection 156 receives and provides Internet protocol traffic of the users from and to the access point and session manager 142. The second connection 158 of the public Internet port 152 provides a connection to the home network (PLMN public land mobile network) backbone. This second connection 158 receives traffic from and provides traffic to the location and session manager 148 and the access point and session manager 142. This traffic consists of GPRS tunnelling protocol traffic to and from the location and session manager 158 and the access point and session manager 142 and GPRS domain name system traffic from the location and session manager 148.

The private intranet port 154 has three connections 160 to 164. The first connection 162 provides a tunnel or connection to the intranet access point and receives traffic from and provides traffic to the access point and session manager 142. This traffic comprises the user's Internet protocol traffic. The second connection 162 provides a connection to the GSM radio access gateway 3 as does the third connection 164. The second and third connections 162 and 164 receive and provide GPRS mobility management and session management signalling.

This intranet GPRS support node 130 has the advantage that the interfaces between the base station 2 and the serving GPRS support node, between the base station 2 and the mobile services switching centre 116, between the serving GPRS support node and home location register 120 are tunnelled or connected using the Internet protocol. This allows embodiments of the present invention to be implemented more simply and more cheaply as compared to the corresponding network element used in the currently proposed GPRS systems. In some embodiments, the Ethernet may be used instead or in addition to the Internet. Traffic intended for a user within the WIO environment from another user within the WIO environment does not need to travel over the Internet back to the intranet via the remote operator Public Land Mobile Network gateway GPRS support node 182. This improves both performance and security.

A summary of the steps taken to establish a GPRS connection within the office environment WIO are as follows:

1. Mobile terminal sends an Attach Request to IGSN 130 using its SGSN function via the GSM Radio Access Gateway 3.
2. IGSN optionally uses the LDAP protocol to check if the identified terminal is a subscriber of the intranet local register 128.
3. If the identity code is found from the LDAP based intranet-local register 28, the user is authenticated (exchange of authentication data between the intranet location register and the mobile terminal, via, IGSN 130 and the GSM radio access gateway 3. Finally the IGSN 130 sends an attach accept message to the mobile terminal 1 via the GSM radio gateway 3. Go to step 6.
4. If the identity code was not found in the intranet location register a query is made via the signalling gateway 106 to the home location register 120 in the PLMN network 200.
5. If the identity code is found in the home location register 120, the user is authenticated (exchange of authentication data between the home location register 120 and the mobile terminal 1 via the IGSN 130, signalling gateway 106 and the home location register 120. The IGSN 130 sends an attach accept message to the mobile terminal 1 via the GSM radio access gateway 3.

6. To get an Internet protocol address, the mobile terminal then sends an activate packet data protocol context request to the IGSN 130 using its SGSN function via the GSM radio access gateway 3.
7. The IGSN's 130 SGSN function sends internally a corresponding create packet data protocol context request to its own GGSN function.
8. The IGSN's 130 GGSN function allocates an IP address to the mobile terminal by replying internally to the IGSN's 130 SGSN function with a create packet data protocol context response message.
9. The IGSN's 130 SGSN part then sends activate packet data protocol context accept message to the mobile terminal via the GSM radio access gateway 3.
10. Now the session is established and the external computers may communicate to the mobile terminal using IP via the IGSN 130 and the GSM radio access gateway 3.

Those same steps except steps 2 and 3 are used to establish a connection with the external environment.

The GSM radio access gateway 3 can be modified so as to deal with HIPERLAN based radio access or any other wireless local area network based access. HIPERLAN is a local area network standard. This may be as an alternative or additional to the radio access based on the GSM standard. It is possible to modify the mobile telephones so that they use HIPERLAN based radio access. Again this may be as an alternative to or additional to the use of the GSM standard. In the latter case dual mode telephones could be provided which can use both the GSM standard and the HIPERLAN based radio access. This is advantageous in that HIPERLAN could be used in the WIO office and GSM used in the external environment. This improves performance within the local area network of the WIO office and allows the roaming infrastructure provided by GSM to be used when the telephone is outside the WIO environment.

This can be achieved by integrating mobile IP home and foreign agent functionality in the IGSN 130 i.e. roaming. By adding wireless LAN support in an interface of the IGSN and by integrating the mobile IP Internet protocol with the IGSN's GGSN function (IP address allocation, session management), roaming can be achieved. When roaming outside the wireless local area network coverage area, a session must be re-established using GPRS protocols, but the same Internet protocol address may be re-used by the dual mode terminal.

In some embodiments of the invention, the intranet location register can be omitted. Instead the home location register of the network operator can be used to store the required information. The home location register is connected to the intranet, via the signalling gateway 106 and the IGSN 130 at the corporate premises. The home location register includes WIO and GPRS functionality. If the network operator supports location based billing schemes, the GPRS service may be provided with a discount to users accessing the service via the customer's GSM radio access gateway 3 and the IGSN 130.

It should be appreciated, that in some embodiments, the intranet GPRS support node is only connected to the GSM radio access gateway 3 within the office environment. The other connections shown within the office between the intranet GPRS support node 130 and the wireless local area network 192, the intranet 190 and the intranet local register 128 are all optional.

The WIO network may instead be a network provided by an Internet service provider.

Whilst preferred embodiments of the present invention have used the LDAP protocol, any other suitable protocol can be used. Likewise whilst the preferred embodiment of the present invention has been described in the context of a GPRS service, embodiments of the present invention may use any other suitable data service. Likewise embodiments of the present invention are also compatible with any suitable wireless communications standard or method as well as GSM.

In the preferred embodiment of the present invention, the Internet protocol is used for the payload within in the WIO office and for connection between the WIO office and the GSM network.

The embodiment of the present invention described hereinbefore allows the information technology department of a corporation to manage its own user base and hence to manage its internal radio network. In particular GPRS communications which both originate and arrive at users within the internal network may not incur charges with the operator which manages the external network to which the corporate network is connected for external communications.

Embodiments of the present invention have the advantage that an integrated wireless system can be provided for both voice and data communication within an office which is compatible with the protocols which are used in the office. The protocols which are preferred in the office environment may be different to those used in the networks. Embodiments of the present invention also are compatible with the Internet, the Internet protocol or other protocols which are typically used or proposed to be used in the office environment in computer networks. This means that those with information technology experience are able to manage the internal corporate network.

Thus, while there have been shown and described and pointed out fundamental novel features of the present invention as applied to preferred embodiments thereof, it will be understood that various omissions and substitutions and changes in the form and details of the devices described and illustrated, and in their operation, and of the methods described may be made by those skilled in the art without departing from the spirit of the present invention. For example, it is expressly intended that all combinations of those elements and/or method steps which perform substantially the same function in substantially the same way to achieve the same results are within the scope of the invention. Substitutions of elements from one described embodiment to another are also fully intended and contemplated. It is the intention, therefore, to be limited only as indicated by the scope of the claims appended hereto.

What is claimed is:
1. A network element, comprising:
    a first interface configured to communicate with a first internet protocol based network using an internet protocol to receive signals from and send signals to the first network, said first internet protocol based network being a private computer based network comprising wireless capabilities, said first interface being configured such that internet protocol traffic intended for a wireless user equipment within said first internet protocol based network from another user equipment within said first network can occur without any signaling occurring externally of said first network; and
    a second interface configured to communicate with a second external packet data network via an internet protocol based connection to receive signals from and send signals to the second packet data network, said wireless user equipment being usable with said second network,
    wherein the network element is located between the first internet protocol based network and the second external packet data network, and wherein said network element is configured to determine whether a particular wireless user equipment is a subscriber of the first network and when said particular wireless user equipment is not a subscriber of the first network to make a query to a home location register in said second network.

2. The network element of claim 1, wherein said first interface is configured to use a tunneling protocol to communicate with the first internet protocol based network.

3. The network element of claim 2, wherein said tunneling protocol is one of layer two tunneling protocol and general packet radio service tunneling protocol.

4. The network element of claim 1, wherein said second packet data network is a general packet radio service network and said network element incorporates serving general packet radio service support node and gateway general packet radio service support node functionality.

5. The network element of claim 1, wherein said second interface includes at least one of the following layers in a protocol stack of the second interface: mobile application part, transaction capabilities application part, user datagram protocol, or internet protocol.

6. The network element of claim 1, wherein said second interface is configured to communicate with a gateway element of said second packet data network.

7. The network element of claim 1, wherein the first interface uses a lightweight directory access protocol to communicate with at least one element of said first internet protocol based network.

8. A communications system comprising a first internet protocol based network and a second packet data network, said first and second networks being connected by the network element of claim 1.

9. The system of claim 8, wherein said second packet data network is connected to said network element by a border gateway.

10. The system of claim 9 wherein said border gateway and said network element are connected by a tunnel.

11. The system of claim 9, wherein said second packet data network is connected to said network element by a virtual private network.

12. The system of claim 8, wherein at least one of said first and second networks comprises a wireless communication part.

13. The system of claim 12, wherein the wireless communication part is configured to use the global system for mobile communication standard.

14. The system of claim 12, wherein said second packet data network is a general packet radio service network.

15. The system of claim 8, wherein said first internet protocol based network is a wireless intranet office network.

16. The system of claim 8, wherein said first internet protocol based network comprises a register for storing information relating to users in said first internet protocol based network, said register being configured to be connected to said network element.

17. The system of claim 16, wherein said register complies with a lightweight directory access protocol.

18. The system of claim 8, wherein said second packet data network comprises a register for storing information relating to users in the first internet protocol based network, said register being accessible by said network element.

19. The system of claim 16, wherein said register is configured to store information relating to user configurations.

20. The system of claim 8, wherein a signaling gateway is provided in said second packet data network to modify signals sent to and from said first internet protocol based network to provide compatibility with said second packet data network and vice versa.

21. The system of claim 8, wherein the cellular communications terminal is a dual mode terminal configured to permit a user to use a wireless local area network mode in the first internet protocol based network and a general packet radio service mode in the second packet data network.

22. The system of claim 8, wherein said network element is part of said first internet protocol based network.

23. A network element, comprising:
first interface means for communicating with a first internet protocol based network using an internet protocol to receive signals from and send signals to the first network, said first internet protocol based network being a private computer based network comprising wireless capabilities, said interface being configured such that internet protocol traffic intended for a wireless user equipment within said first internet protocol based network from another user equipment within said first network can occur without any signaling occurring externally of said first network; and
second interface means for communicating with a second external packet data network via an internet protocol based connection to receive signals from and send signals to the second packet data network, said wireless user equipment being usable with said second network,
wherein the network element is located between the first internet protocol based network and the second external packet data network, and
wherein said network element comprises means for determining whether a particular wireless user equipment is a subscriber of the first network and means for making a query to a home location register in said second network when said particular wireless user equipment is not a subscriber of the first network.

* * * * *